UNITED STATES PATENT OFFICE.

ALBRECHT SCHMIDT AND GEORG KRÄNZLEIN, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

UREA OF THE ANTHRAQUINONE SERIES AND PROCESS OF MAKING SAME.

958,325.  Specification of Letters Patent.  Patented May 17, 1910.

No Drawing.  Application filed October 27, 1909.  Serial No. 524,953.

*To all whom it may concern:*

Be it known that we, ALBRECHT SCHMIDT and GEORG KRÄNZLEIN, citizens of the Empire of Germany, residing at Höchst-on-Main, Germany, have invented certain new and useful Improvements in Ureas of the Anthraquinone Series, of which the following is a specification.

The anthraquinonyl ureas (A.NH.CO.NH.R)

have not been disclosed hitherto, neither those of the alpha series nor those of the beta series.

We have now found that the anthraquinonyl ureas of the beta series, that is to say urea derivatives for instance of the type A.NH.OC.NH.R—in which "A" stands for a residue of beta-anthraquinonyl and "R" for an aromatic residue such as anthraquinonyl, anthraquinonyl urea and the like—can be obtained by treating the beta-anthraquinonyl derivatives of the type A.NH.OC.RI—in which "RI" stands for a residue such as alcoxyl, aroxyl, chlorin, etc.—that is to say beta-anthraquinonyl compounds, for instance beta-anthraquinonyl urethane, beta-anthraquinonyl urea chlorid, with such amins as for instance amidoanthraquinones, diamidoanthraquinones, etc. Thus for instance the symmetrical beta-beta-dianthraquinonyl urea (beta) A.NH.CO.NH.A. (beta), *i. e.* an urea of the type beta A.NH.CO.NH.R.—in which "R" also stands for a residue of beta-anthraquinonyl,—can be produced by heating a beta-anthraquinonyl urethane, for instance (beta) A.NH.CO.OC₂H₅, or for instance a corresponding beta-anthraquinonyl urea chlorid (beta) A.NH.OC.Cl with the respective beta-amidoanthraquinone. In this manner for instance by heating the beta-anthraquinonyl urethane with beta-amidoanthraquinone, a yellow substance is produced which is insoluble in alkali and which must be regarded as beta-beta-dianthraquinonyl urea. The same substance is obtained by heating with beta-amidoanthraquinone the urea chlorid which, for instance, is obtained by introducing an excess of phosgene into a cold suspension of beta-amidoanthraquinone in nitrobenzene. Thus also the unsymmetrical ureas which—contrary to what is the case with the symmetrical beta-beta-dianthraquinonyl urea, do not contain the same residue of beta-anthraquinonyl, can be obtained by heating the beta-anthraquinonyl urea chlorid (or less promptly by heating the beta-anthraquinonyl urethane) with such amins as alpha-amidoanthraquinone, diamidoanthraquinones etc. These beta-anthraquinonyl urea derivatives are to be used as parent materials for other valuable dyestuffs and are themselves vat dyestuffs of great value.

Example I: 30 kg. of beta-anthraquinonyl urethane, obtained from beta-amidoanthraquinone and ethyl-chloro-carbonate, are mixed with 22.5 kg. of beta-amidoanthraquinone and immediately heated for a short time to about 250°. The resulting yellow product of the reaction is purified by means of nitrobenzene. The substance thus obtained is insoluble in acids and alkalies; when combined with an alkaline solution of hydrosulfite it forms a reddish-brown vat from which particularly cotton, but also wool, are dyed yellow tints. It has the constitution

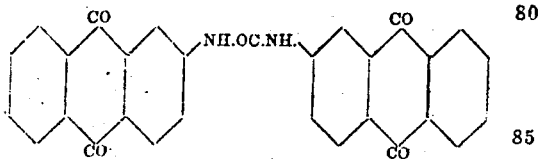

For preparing larger quantities, it is advantageous to add a neutral solvent with a high boiling point, such as for instance naphthalene, for the purpose of better equalizing the temperature. If, instead of the above-mentioned urethane, the product obtainable by the reaction of an excess of phosgene on beta-amidoanthraquinone nitrobenzene in the cold (beta-anthraquinonyl urea chlorid) is used as parent-material and heated with beta-amidoanthraquinone, an analogous result is obtained. The procedure for producing the beta-anthraquinone urea chlorid is as follows: An excess of phosgene is introduced into a suspension of 22.3 parts by weight of beta-amidoanthraquinone in about 200 parts of nitrobenzene in the cold; this mixture is stirred until the orange yellow color of the beta-amidoanthraquinone has turned to a grayish-white color and until the nydrochlorid of beta-amidoanthraquinone has gradually disappeared. The resulting paste is filtered off and washed with benzene; after removing the benzene, the chlorid obtained is mixed with 23.3 parts of beta-amidoanthraquinone and heated with nitrobenzene or with another solvent, or with or without the addition of an alkaline substance. The product is the same as regards its properties as the product above described.

As the beta-anthraquinonyl urea chlorid when combined with water partly breaks up into beta-amidoanthraquinone, carbon dioxid and hydrochloric acid, the dianthraquinonyl urea is also formed according to the reaction above referred to, by heating the beta-anthraquinonyl urea chlorid alone with a little quantity of water or with alkalies and water, for instance by heating it in technical hydrous nitrobenzene, although in the latter case it is contaminated with beta-amidoanthraquinones.

In the last-mentioned manner considerable quantities of beta-beta-dianthraquinonyl urea are, for instance, obtained by heating the above-mentioned suspension of beta-anthraquinonyl urea chlorid in technical undried nitrobenzene; thus by heating 50 grams of beta-anthraquinonyl urea chlorid in 1000 grams of technical, perfectly clear but not particularly dried, nitrobenzene and then filtering off the resulting product hot, 28.5 grams of beta-beta-dianthraquinonyl urea, i. e. about 75% of the theoretical quantity, are obtained. The same yield is obtained by heating the beta-anthraquinonyl urea chlorid to 100° with three times its quantity of water and purifying the resulting product with nitrobenzene; thus, for instance, from 127 grams of urea chlorid 79 grams of beta-beta-dianthraquinonyl urea are obtained, that is to say about 77% of the theoretical quantity.

If the beta-anthraquinonyl urea chlorid is replaced by beta-beta-anthraquinonylene diurea chlorid, obtainable by the reaction of an excess of phosgene on beta-beta-diamidoanthraquinone, and the latter is heated with alpha-amidoanthraquinone (2 molecules), a urea derivative dyeing in the vat gold-yellow tints is obtained, the procedure being as follows: 18.2 kgr. of 2.6 anthraquinonylene diurea chlorid, obtainable, like the beta-anthraquinonyl urea chlorid, by the action of phosgene on a suspension of 2.6 diamidoanthraquinone in nitrobenzene, are gradually heated to ebullition with 22.3 kg. of alpha-amidoanthraquinone in 400 kg. of absolutely dry nitrobenzene, while stirring. After some hours the mass is allowed to cool, is then filtered off, washed with alcohol and dried. The yellow dyestuff thus produced dissolves in concentrated sulfuric acid with an orange-red color and dyes from the alkaline hydrosulfite vat cotton rich gold-yellow tints of great fastness.

If alpha-amidoanthraquinone is substituted for beta-amidoanthraquinone, i. e. if beta-anthraquinonyl urea chlorid (one molecule) is heated with alpha-amidoanthraquinone, a reaction-product is obtained dyeing in the vat yellowish tints of a greenish hue; the same substance may also be produced by heating the beta-anthraquinonyl urethane with alpha-amidoanthraquinone, but in this case it is much less pure and intermixed with other substances of unknown composition. If alpha-alpha-diamidoanthraquinone is substituted for alpha-amidoanthraquinone, i. e. if beta-anthraquinonyl urea chlorid (2 molecules) are heated with an alpha-alpha-diamidoanthraquinone, brown vat dyestuffs are obtained, the procedure being as shown by the following example: 11.95 kg. of 1.5 diamidoanthraquinone and 400 kg. of nitrobenzene are heated to ebullition and then 28.6 kg. of beta-anthraquinonyl urea chlorid are introduced while stirring. After having been boiled for several hours the mass is allowed to cool, is then filtered off, washed with alcohol and dried. The brown powder thus obtained dissolves in alkaline hydrosulfite with a reddish-brown color and dyes from this solution wool and cotton reddish-brown tints of excellent qualities as regards fastness. If instead of the 1.5 diamidoanthraquinone the 1.4 or 1.8-diamidoanthraquinone is used, brown dyestuffs of great value are obtained in an analogous manner. The urea-derivative produced from 1.4-diamidoanthraquinone and beta-anthraquinonyl urea chlorid (2 molecules) dyes from the alkaline hydrosulfite vat cotton brown tints, while the 1.8 anthraquinonyl urea produced from 1.8 diamidoanthraquinone dyes cotton yellowish-brown tints of a somewhat fainter hue than those obtainable from 1.5 diamidoanthraquinone. If, in the foregoing example, for the 1.5 diamidoanthraquinone 2.6-diamidoanthraquinone is substituted, an anthraquinonyl urea is obtained which dyes cotton in the vat fast yellow tints.

For dyeing purposes the procedure may for instance be as follows: One part by weight of the dyestuff obtainable from beta-anthraquinonyl urethane and beta-amidoanthraquinone, or from beta-anthraquinonyl urea chlorid and beta-amidoanthraquinone, is mixed and stirred with 50 parts of water and 2 parts of caustic soda lye of 40° Bé.; to this are added 1½ parts of concentrated hydrosulfite powder and the whole is heated to 30-50° C. until it forms a solution. This "mother-vat" is introduced into the "dye-vat" containing 500 parts of water and 10 parts of Glauber salt, then the cotton is dyed in this vat for half an hour in the cold, squeezed and allowed to oxidize in the air. Thus a fast bright yellow tint is obtained. The procedure for dyeing wool is similar, except that this material is dyed in fainter and somewhat duller tints.

For printing purposes the procedure may for instance be as follows:

30 grams of beta-beta-di-anthraquinonyl urea are heated on the water-bath to 50° with:
60 ccm. of caustic soda lye of 40° Bé.,
50 grams concentrated hydrosulfite powder, and
110 ccm. of water until reduction occurs; then
400 grams of British gum and
50 grams of hydrosulfite N. F. conc. 1:1 are added and the whole stirred.

1000 grams

The material is printed, dried, steamed for 10 minutes at 100° with the exclusion of air, washed and soaped at 60°.

| Dyestuff from — | Body-color. | Solution in conc. $H_2SO_4$. | Color of the vat. | Dyeing in the vat on wool and cotton. |
|---|---|---|---|---|
| anthraquinonyl urethane or beta-anthraquinonyl urea chlorid + beta-amidoanthraquinone (beta-beta-di-anthraquinonyl urea). | Yellow. | Orange red. | Reddish brown. | Yellow. |
| Beta-anthraquinonyl urea chlorid + alpha-amidoanthraquinone (beta-alpha-di-anthraquinonyl urea.) | Greenish yellow. | Reddish brown. | Reddish brown. | Yellow. |
| beta-beta-anthraquinonylene diurea chlorid + 2 mol. of alpha-amidoanthraquinone. | Yellow. | Orange red. | Reddish brown. | Gold-yellow. |
| 2 mol. of beta-anthraquinonyl urea chlorid + 1 mol. of 1,4-diamido-anthraquinone. | Brown. | Brown. | Reddish brown. | Brown. |
| 2 mol. of beta-anthraquinonyl urea chlorid + 1 mol. of 1,5-diamido-anthraquinone. | Brown. | Reddish brown. | Reddish brown. | Reddish brown. |
| 2 mol. of beta-anthraquinonyl urea chlorid + 1 mol. of 1,8-diamido-anthraquinone. | Brown. | Reddish brown. | Reddish brown. | Yellowish brown. |

Having now particularly described our invention, what we claim is:

1. As new products, the herein-described anthraquinone-ureas, obtainable by heating beta-anthraquinonyl urethanes or beta-anthraquinonyl urea chlorids with such amins as amidoanthraquinones, di-amidoanthraquinones, said products being yellow to reddish-brown substances, soluble in concentrated sulfuric acid with an orange-red to brown color, soluble in alkaline hydrosulfite solution with a reddish-brown color, and dyeing cotton and wool yellow to brown and reddish-brown tints.

2. As a new product, the herein described beta-beta-di-anthraquinonyl urea of the formula:

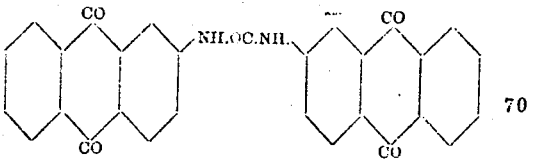

obtainable by the reaction of beta-anthraquinonyl urethane or beta-anthraquinonyl urea chlorid on beta-amidoanthraquinone, being a yellow substance, soluble in concentrated sulfuric acid with an orange-red color, soluble in alkaline hydrosulfite solution with a reddish-brown color, and dyeing cotton and wool yellow tints.

3. The herein described process of manufacturing ureas of the anthraquinone series, which consists in heating beta-anthraquinonyl urethanes or beta-anthraquinonyl urea chlorids with such amins as amidoanthraquinones and di-amidoanthraquinones.

In testimony whereof, we affix our signatures in presence of two witnesses.

ALBRECHT SCHMIDT.
GEORG KRÄNZLEIN.

Witnesses:
JEAN GRUND,
CARL GRUND.